United States Patent
Servais

(10) Patent No.: US 11,199,646 B2
(45) Date of Patent: Dec. 14, 2021

(54) PERFORMING DYNAMIC TIME WARPING WITH NULL OR MISSING DATA

(71) Applicant: Landmark Graphics Corporation, Houston, TX (US)

(72) Inventor: Marc Paul Servais, Reading (GB)

(73) Assignee: Landmark Graphics Corporation, Houston, TX (US)

( * ) Notice: Subject to any disclaimer, the term of this patent is extended or adjusted under 35 U.S.C. 154(b) by 6 days.

(21) Appl. No.: 16/954,880

(22) PCT Filed: Dec. 12, 2019

(86) PCT No.: PCT/US2019/065920
§ 371 (c)(1),
(2) Date: Jun. 17, 2020

(87) PCT Pub. No.: WO2021/040770
PCT Pub. Date: Mar. 4, 2021

(65) Prior Publication Data
US 2021/0293990 A1    Sep. 23, 2021

Related U.S. Application Data

(60) Provisional application No. 62/891,782, filed on Aug. 26, 2019, provisional application No. 62/891,780, filed on Aug. 26, 2019.

(51) Int. Cl.
*G01V 11/00* (2006.01)
*E21B 47/12* (2012.01)
(Continued)

(52) U.S. Cl.
CPC ............ *G01V 11/002* (2013.01); *E21B 47/12* (2013.01); *E21B 49/00* (2013.01); *G01V 1/48* (2013.01); *G01V 3/38* (2013.01)

(58) Field of Classification Search
CPC .......... G01V 11/002; G01V 1/48; G01V 3/38; E21B 47/12; E21B 49/00
See application file for complete search history.

(56) References Cited

U.S. PATENT DOCUMENTS 10,042,081 B2    8/2018    Benson et al.
10,459,098 B2 *  10/2019   Grant .................... G01V 1/362
(Continued)

FOREIGN PATENT DOCUMENTS

JP      2003146794 A      5/2003
JP      2004348594 A      12/2004
(Continued)

OTHER PUBLICATIONS

Filing Receipt, Specification and Drawings for U.S. Appl. No. 62/891,780, entitled "Dynamic Time Warping of Signals Plus User Picks," filed Aug. 26, 2019, 37 pages.
(Continued)

*Primary Examiner* — Franklin D Balseca
(74) *Attorney, Agent, or Firm* — Conley Rose, P.C.; Rodney B. Carroll

(57) ABSTRACT

A method for correlating data includes acquiring a first sequence of data and a second sequence of data, wherein the first sequence of data comprises at least a first data point including a first set of signal components and the second sequence of data comprises at least a second data point including a second set of signal components, wherein the signal components in the first and second sets of signal components contain valid data, nulls, or a combination thereof; identifying one or more nulls in at least one of the first set of signal components or the second set of signal components; defining a difference between the one or more nulls and a component value as a real value; and calculating a distance between the first data point and the second data
(Continued)

point based on the difference between the one or more nulls and the component value.

22 Claims, 6 Drawing Sheets

(51) Int. Cl.
    *G01V 1/48*     (2006.01)
    *G01V 3/38*     (2006.01)
    *E21B 49/00*     (2006.01)

(56) References Cited

U.S. PATENT DOCUMENTS

| | | |
|---|---|---|
| 10,753,202 B2 * | 8/2020 | Spencer Elkington .. G01V 3/20 |
| 2014/0316706 A1 | 10/2014 | Grant et al. |
| 2015/0088424 A1 | 3/2015 | Burlakov et al. |
| 2016/0327678 A1 | 11/2016 | Benson et al. |
| 2016/0334542 A1 | 11/2016 | Chiu et al. |
| 2018/0112522 A1 | 4/2018 | Androvandi et al. |
| 2019/0383133 A1 * | 12/2019 | Pollack .................. E21B 47/12 |

FOREIGN PATENT DOCUMENTS

| | | |
|---|---|---|
| WO | 20180164680 A1 | 9/2018 |
| WO | 2018182691 A1 | 10/2018 |

OTHER PUBLICATIONS

Filing Receipt, Specification and Drawings for U.S. Appl. No. 62/891,782, entitled "Performing Dynamic Time Warping With Null or Missing Data," filed Aug. 26, 2019, 37 pages.
Electronic Acknowledgement Receipt, Specification and Drawings for International Application No. PCT/US2019/065918, entitled "Dynamic Time Warping of Signals Plus User Pick," filed Dec. 12, 2019, 38 pages.
Electronic Acknowledgement Receipt, Specification and Drawings for International Application No. PCT/US2019/065920, entitled "Performing Dynamic Time Warping With Null or Missing Data," filed Dec. 12, 2019, 37 pages.
Foreign Communication from Related Application—International Search Report and Written Opinion of the International Searching Authority, International Application No. PCT/US2019/065918, dated May 25, 2020, 11 pages.
Foreign Communication from Related Application—International Search Report and Written Opinion of the International Searching Authority, International Application No. PCT/US2019/065920, dated May 25, 2020, 10 pages.
Edwards, Jonathan et al., "Uncertainty management in stratigraphic well correlation and stratigraphic architectures: A training-based method," Computers and Geosciences, 2018, pp. 1-17, vol. 111, Elsevier Limited.
Kulkarni, Neha, "Effect of Dynamic Time Warping using different Distance Measures on Time Series Classification," International Journal of Computer Applications, 2017, pp. 34-39, vol. 179, No. 6.
Lallier, Florent et al., "Uncertainty assessment in the stratigraphic well correlation of a carbonate ramp: Method and application to the Beausset Basin, SE France," Comptes Rendus Geoscience, 2016, pp. 499-509, vol. 348, Elsevier.
Salvador, Stan et al., "FastDTW: Toward Accurate Dynamic Time Warping in Linear Time and Space," Florida Institute of Technology, 11 pages.
Wheeler, Loralee, "Automatic and Simultaneous Correlation of Multiple Well Logs," Colorado School of Mines, 2015, 48 pages.
Sitaram, Dinkar et al., "A Measure of Similarity of Time Series Containing Missing Data Using the Mahalanobis Distance," 2015 Second International Conference on Advances in Computing and Communication Engineering, pp. 622-627, IEEE Computer Society.

* cited by examiner

PERFORMING DYNAMIC TIME WARPING WITH NULL OR MISSING DATA

CROSS-REFERENCE TO RELATED APPLICATIONS

This application is a filing under 35 U.S.C. 371 of International Application No. PCT/US2019/065920 filed Dec. 12, 2019 and entitled "Performing Dynamic Time Warping with Null or Missing Data," which claims priority to U.S. Provisional Application No. 62/891,780 filed Aug. 26, 2019 and entitled "Dynamic Time Warping of Signals Plus User Picks," and U.S. Provisional Application No. 62/891,782 filed Aug. 26, 2019 and entitled "Performing Dynamic Time Warping With Null or Missing Data," each of which applications is incorporated by reference herein in its entirety.

BACKGROUND

The present disclosure relates to performing dynamic time warping (DTW) on data sequences with null or missing data.

Hydrocarbons, such as oil and gas, are commonly obtained from subterranean formations that may be located onshore or offshore. Subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Modern petroleum drilling and production operations demand a great quantity of information relating to downhole parameters and conditions. Such information typically includes characteristics of the earth formations traversed by the wellbore, in addition to data relating to the size and configuration of the borehole itself. Oil well logging is a technique for providing information to a formation evaluation professional or driller regarding the particular earth formation being drilled. The collection of information relating to downhole conditions is commonly referred to as "logging," and can be performed by several methods. These methods may include measurement while drilling (MWD), logging while drilling (LWD), and wireline logging.

MWD is the term generally used for measuring conditions downhole concerning the movement and location of the drilling assembly while the drilling continues, while LWD is the term generally used for similar techniques that concentrate more on formation parameter measurement. To perform oil well wireline logging, a probe or "sonde" is lowered into the borehole after some or all of the well has been drilled, and the probe or sonde is used to determine certain characteristics of the formations traversed by the borehole. The sonde may include one or more sensors to measure parameters downhole and may be constructed as a hermetically sealed cylinder for housing such sensors, which may hang at the end of a long cable or "wireline." Normally, the cable supplies operating power to the sonde and is used as an electrical conductor to transmit information signals from the sonde to the surface. One or more measurement techniques may be used to measure various parameters of the earth's formations and correlate those parameters with the position of the sonde in the borehole as the sonde is pulled uphole.

A chart or plot of an earth parameter or of a logging tool signal versus the position or depth in the borehole is generally referred to as a log or well log. A well log can be a record indicative of the geologic formations that are penetrated by a wellbore. A formation may include a succession of rock strata (e.g., subsurface rock layers), typically along a depth scale, with comparable lithology or other similar properties (e.g., color, fossil content, age, chemical composition, physical properties, etc.). A formation may also refer to a group of rocks within a depth range in a drilled well.

The depth may be the distance from the surface of the earth to the location of the tool in the borehole or may be true depth, which is typically the same only for a perfectly vertical straight borehole. The log of the tool signal or raw data may always not provide a clear representation of the earth parameter that the formation evaluation professional or driller needs to know. Therefore, the tool signal may be processed to produce a log that more clearly represents a desired parameter. A well operator or geologist may then manually review the well log to identify strata or other features of interest in the subterranean formation. For example, the well operator may review multiple well logs in a two-dimensional (2D) cross-sectional view or a three-dimensional (3D) view to identify structures or features of interest.

BRIEF DESCRIPTION OF DRAWINGS

These drawings illustrate certain aspects of certain embodiments of the present disclosure. These drawings should not be used to limit or define the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF EMBODIMENTS

Disclosed herein is a robust error metric to calculate differences between data samples in two different signal sequences. The disclosed error metric is defined so as to produce a real-value output when one or both signal sequences contain null input values. In some implementations, the error metric may be employed when performing dynamic time warping (DTW) as part of signal alignment or correlation processes, such as aligning or correlating wireline log data from boreholes of different wells. Further, the error metric and concepts disclosed herein may be extended to a wide range of applications utilizing techniques such as DTW to compare signal sequences having multiple types of samples or components at a particular data point. These and other aspects are described further herein.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. Devices and methods in accordance with certain embodiments may be used in one or more of wireline (including wireline, slickline, and coiled tubing), downhole robot, and drilling operations including MWD and/or LWD.

Figure 1:
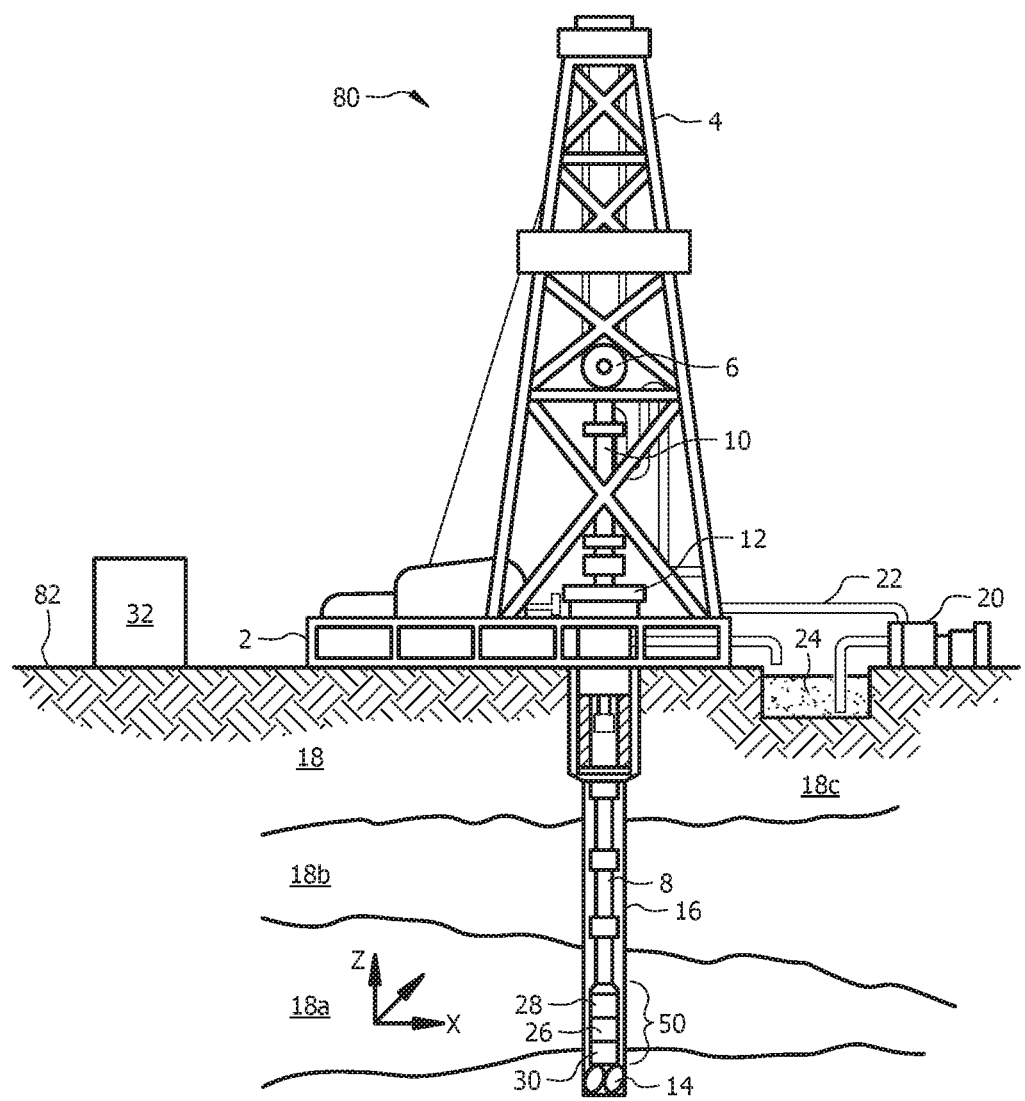
FIG. 1 illustrates an example subterranean drilling system in accordance with embodiments of the present disclosure.

FIG. 1 illustrates an example subterranean drilling system 80, according to aspects of the present disclosure. The drilling system 80 comprises a drilling platform 2 positioned at the surface 82. In the embodiment shown, the surface 82 comprises the top of a formation 18 containing one or more rock strata or layers 18a-c, and the drilling platform 2 may be in contact with the surface 82. In other embodiments, such as in an off-shore drilling operation, the surface 82 may be separated from the drilling platform 2 by a volume of water. The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus between drill string 8 and borehole 16, and into a retention pit 24. The drilling fluid lubricates the drill string 8, transports cuttings from the borehole 16 into the pit 24 and aids in maintaining integrity or the borehole 16.

The drilling system 80 may comprise a bottom hole assembly (BHA) 50 coupled to the drill string 8 near the drill bit 14. The BHA 50 may comprise different combinations of drill collars; subs such as stabilizers, reamers, shocks, holeopeners; and various downhole tools, including, but not limited to, LWD/MWD systems, telemetry systems, downhole motors to drive the drill bit 14, and rotary steerable assemblies for changing the drilling direction of the drill bit 14. As depicted, the BHA 50 comprises LWD/MWD elements 26, telemetry element 28, and downhole power generator 30. As the bit 14 extends the borehole 16 through the formations 18, the LWD/MWD elements 26 may collect measurements relating to borehole 16. The LWD/MWD elements 26 may be communicably coupled to the telemetry element 28. The telemetry element 28 may transfer measurements from LWD/MWD elements 26 to a surface receiver and/or to receive commands from the surface receiver via a system controller 32. The telemetry element 28 may comprise a mud pulse telemetry system, an acoustic telemetry system, a wired communications system, a wireless communications system, or any other type of communications system that would be appreciated by one of ordinary skill in the art in view of this disclosure. In certain embodiments, some or all of the measurements taken at the LWD/MWD elements 26 may also be stored within the LWD/MWD elements 26 or the telemetry element 28 for later retrieval at the surface 82 by the system controller 32.

The downhole power generator 30 may be coupled and provide power to electronic components within the BHA 50, including electronic components within the LWD/MWD elements 26 and telemetry system 28. Example electronic components include, but are not limited to, sensors, control units, motors, and solenoids. The downhole power generator 30 may comprise one or more alternators and associated circuitry to generate AC output signals that are then converted to provide DC power to the BHA 50 and electrical components thereof. The generator 30 may generate power based on the operation of drill string 8, or based on the flow of drilling fluid through components of drilling system 80. The amount of power provided by the generator 30 may depend, in part, on the power requirements of the electronic components in the BHA 50, the number of alternators within the generator 30, and the power ratings of the electronic components within the generator 30. The number and arrangement of alternators may depend, in part, on the configuration of the generator 30 and the voltage requirements of the BHA 50. In some embodiments, as will be described in detail below, one or more current sensing circuits may be included in the generator 30 to control and protect electronic components from damage caused by harsh downhole conditions.

Figure 2:
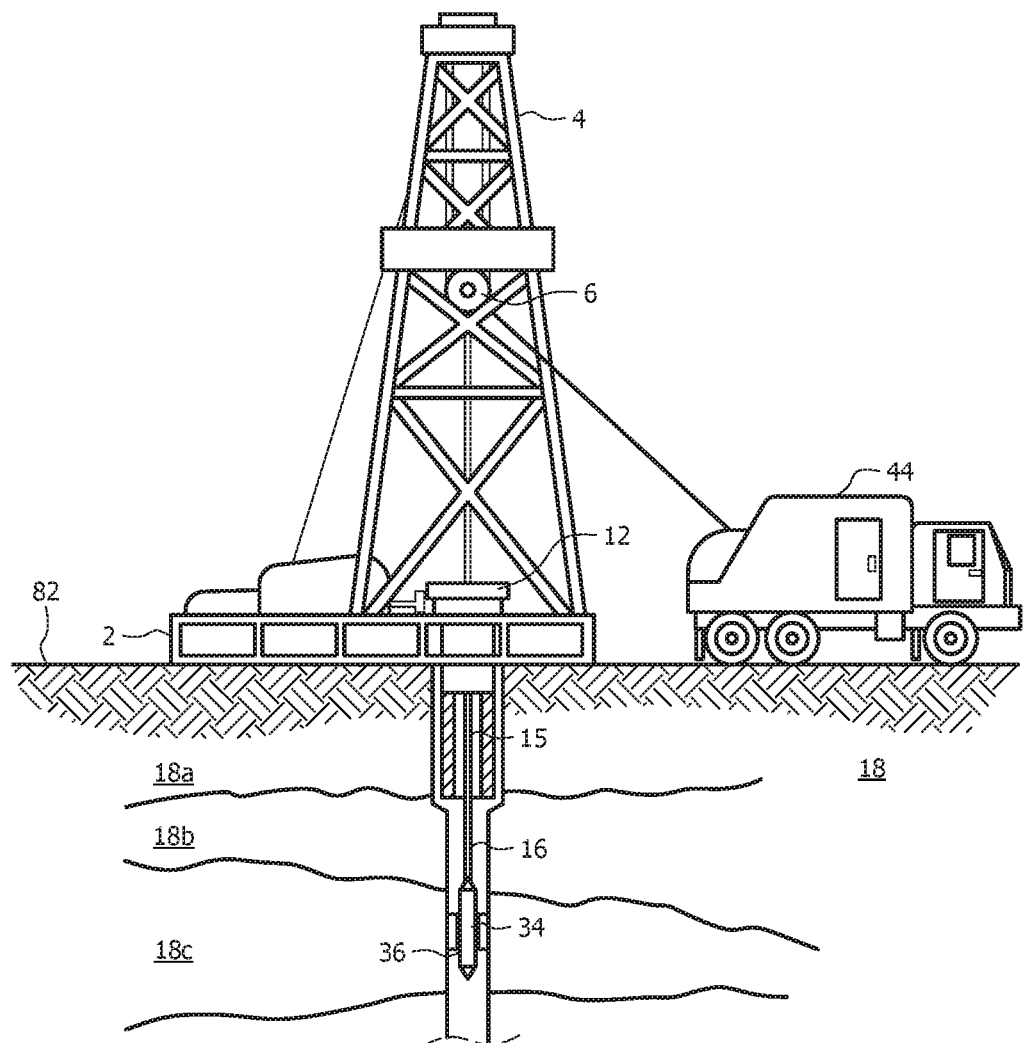
FIG. 2 illustrates an example subterranean drilling system with the drill string removed in accordance with embodiments of the present disclosure.

At various times during or after the drilling process, the drill string 8 may be removed from the borehole 16 as shown in FIG. 2. Once the drill string 8 has been removed, measurement/logging operations can be conducted using a wireline tool 34, i.e., an instrument that is suspended into the borehole 16 by a cable 15 having conductors for transporting power to the tool from a surface power source (e.g., a thermoelectric power generator), and telemetry from the tool body to the surface 82. The power transported from the surface may comprise AC power, for instance, that is converted to DC power downhole, or it may comprise DC power that is transmitted from the surface. The wireline tool 34 may comprise electronic components similar to the electronic components described above. For instance, the wireline tool 34 may comprise logging and measurement elements 36, similar to the LWD/MWD elements of BHA 50 described above, which may comprise one or more electronic components in the form of sensors and controllers. The logging and measurement elements 36 may perform functions such as measuring current, voltage, pressure, and/or temperature of electronic components associated with downhole tools (e.g., wireline tool 34).

The logging and measurement elements 36 may be communicatively coupled to the cable 15. A logging facility 44 (shown in FIG. 2 as a truck, although it may be any other structure) may collect measurements from the tool 36, and may include computing facilities (including, e.g., a control unit/information handling system) for controlling, processing, storing, and/or visualizing the measurements gathered by the elements 36. The computing facilities may be communicatively coupled to the elements 36 by way of the cable 15. In certain embodiments, the system controller 32 may serve as the computing facilities of the logging facility 44.

Modifications, additions, or omissions may be made to FIGS. 1-2 without departing from the scope of the present disclosure. For instance, FIGS. 1-2 illustrate components of subterranean drilling system 80 in a particular configuration. As an example, the position of the generator 30 within the BHA 50 of the system 80 may differ from the embodiment depicted. It will be understood that any suitable configuration of components for drilling or logging a wellbore may be used. Furthermore, fewer components or additional components beyond those illustrated may be included in subterranean drilling system 80 without departing from the scope of the present disclosure.

Collecting well log data from boreholes (e.g., borehole 16) drilled in the earth provides information that may be analyzed for subsurface formation depth structure within oil or gas fields. The information derived may indicate the type of rock in the subsurface and may be used to identify boundaries of geologic intervals in the formation depth structure. Geological intervals are layers of rock structure estimated to have the same geological age. Depending on the context, the term "geological interval" may also refer to the intersection between the geological layer and wellbore. Identifiable boundaries of geologic intervals are referred to as geologic markers or geologic tops.

Nuclear, gamma ray, gamma ray intensity, electromagnetic, sonic, magnetic, or other source instrumentation may be lowered into the boreholes to generate source signals that probe the underground formations. The formations or geologic tops modify or respond to the source signals, and sensors disposed with the source instrumentation in the boreholes may monitor the resulting or modified response signals. The response signal characteristics, for example, its amplitude, vary with different types of source signals and also depend on the type of formation or geologic top observed. In some embodiments, the response signal characteristics may represent one or more data measurements indicative of density, porosity, velocity, resistivity, or permeability of a certain formation or sample. Additionally or alternatively, the response signal characteristics may comprise temperature, wind speed, and rainfall measurements at a particular location and/or time. Such data may be collected over time and collectively called "well log curves" or "well logs." The well logs may be recorded as a function of depth in the boreholes, one recorded curve (or trace) for each type of source.

In some embodiments, multiple boreholes may be used to collect data from multiple wells, and to spatially track the various formations or geologic tops under test. For example, a number of bores may be bored at locations miles or hundreds of yards apart for such analysis. For deeper analysis, hundreds or thousands of wells may be bored, where each well may be spaced from about one-quarter to one-half mile apart. Boring to a typical depth of 10,000 feet allows multiple formations to be observed in the response traces. A geoscientist may then map the location of the subsurface formations from multiple numbers of well logs. This generally refers to a correlation process, in which the geologist attempts to match features in traces recorded from one well log to similar features in traces from one or more other well logs.

Geologic correlation workflow is frequently used in a number of activities such as mining, oil and gas exploration and production, geothermal development, water extraction, $CO_2$ sequestration, geologic engineering, waste management, etc. However, the interpretation of geologic tops in oil or gas fields can often be difficult and time consuming. For example, although interpreters may manually correlate a small number of well logs in a matter of minutes, this task becomes more difficult and time consuming as the number of logs increases. To facilitate the correlation process, dynamic time warping (DTW) may be employed to measure similarity between two sequences of well data or well logs, and/or to align two sequences that may vary in speed, where such sequences may include time-dependent sequences, space-ordered sequences, and/or depth-ordered sequences. For example, DTW may provide an optimal alignment between two time series of data if one time series of data is "warped" by expanding or condensing that time series along its time axis. This warping between the two time series of data may then be used to locate corresponding regions between the time series of data or to determine similarity between the two time series of data.

In some embodiments, data from well logs may be used to acquire certain types of signal sequences such as density, porosity, formation resistivity, velocity, and/or permeability measurements of a particular rock sample. It is to be understood that other suitable types of signal sequences may be acquired from well logs in accordance with embodiments of the disclosure. In additional or alternative embodiments, data from other sensors may be used to acquire signal sequences comprising, for example, temperature, wind speed, and/or rainfall measurements at a particular location and time In well logging applications, a result of DTW can include a set of correlated points between two sequences of well data, e.g., points [1, 2, 3, 4, 5] in one well log may correlate to points [3, 4, 5, 6, 7, 9] in another well log. In practice, however, one or both well logs may be missing some data (null), e.g., due to gaps in one or more signals from which the well log data is acquired. In such cases, it may not be possible to provide a reliable measure of similarity between two sequences of well data. For example, assume one well sequence contains data points [1, 2, 3, 4, 5], while another well sequence contains data points [3, 4, 5, 6, 7, null] (i.e., the other well is missing a sixth data point). If typical DTW algorithms are applied to perform correlation in this example, an undefined value will result due to the missing data point in the other well sequence.

Figure 3:
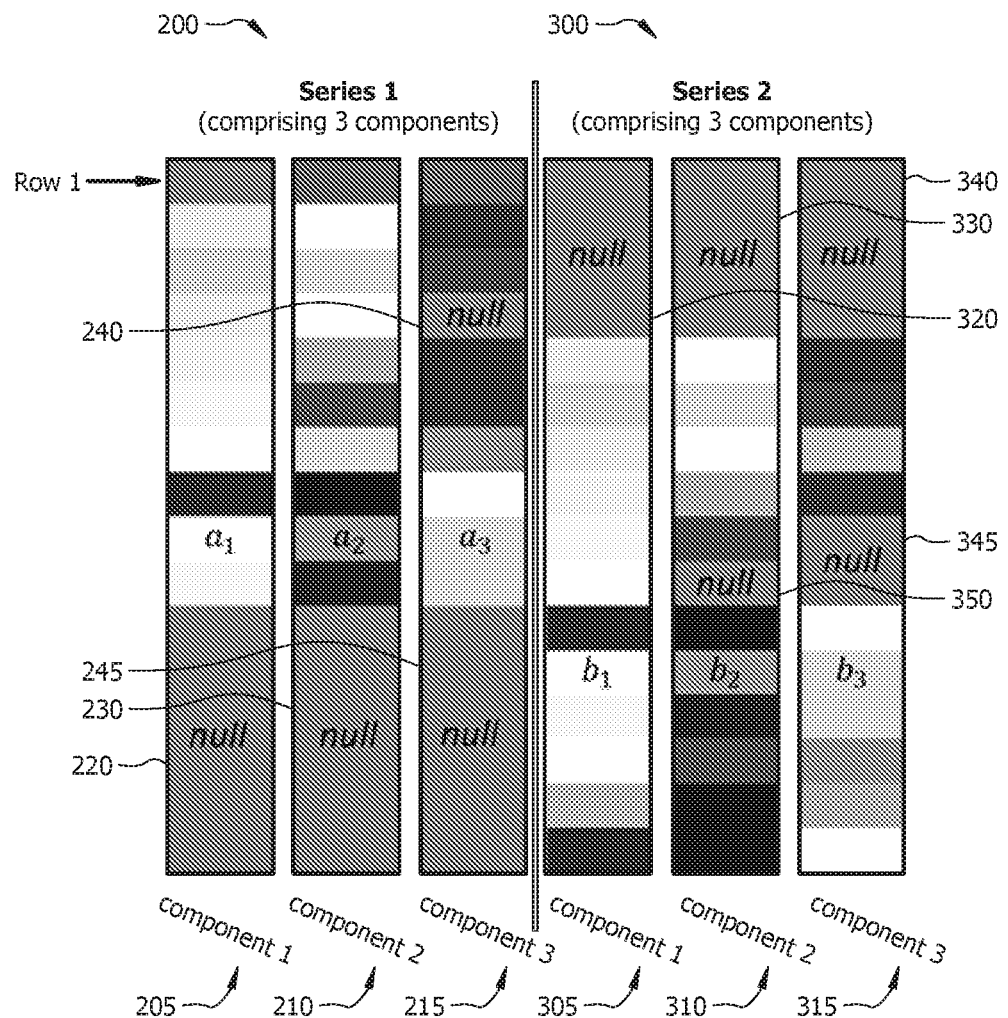
FIG. 3 illustrates an example of two well log sequences in accordance with embodiments of the present disclosure.

FIG. 3 depicts an example of a first sequence signal 200 and a second sequence signal 300 according to embodiments of the present disclosure. The first sequence signal 200 and the second sequence signal 300 comprise a first set of time-series data (hereinafter, "Series 1") and a second set of time-series data (hereinafter, "Series 2"). Series 1 corresponds to a first well log containing measurements from a first well (not shown), while Series 2 corresponds to a second well log containing measurements from a second well (not shown). The first and second wells may be located in a similar area and at a known distance apart from one another (e.g., 100 yards). The first and second wells may comprise different materials (e.g., rock, soil, oil, water, or gas) and vary in thickness and shape. In Series 1 and Series 2, the uppermost top rows represent data from portions at each surface of the first and second wells, while the lowermost bottom rows represent data from bottom portions of the first and second wells.

Series 1 and Series 2 each comprise a number n of components, where n may be any integer greater than or equal to 1. FIG. 3 depicts an example in which Series 1 and Series 2 each comprise three components 205, 210, 215 and 305, 310, 315, where components 205, 210, 215 and 305, 310, 315 correspond to measurement parameters acquired from the first well log and the second well, respectively. Generally speaking, the measurement parameters may correspond to measurements of any desired characteristics of formations associated with the first and second wells. For discussion purposes, it may be assumed that signal components 205 and 305 correspond to respective density measurements from the first and second wells; signal components 210 and 310 correspond to respective porosity measurements from the first and second wells; and signal components 215 and 315 correspond to respective permeability measurements from the first and second wells.

To correlate data acquired from the first well to data acquired from the second well, a certain value or data point (a) from Series 1 may be compared to a certain value or data point (b) from Series 2. It should be understood that data points (a) and (b) need not be from the same sample location in Series 1 and 2. In general, Series 1 and 2 each refer to a signal having three components. As such, both signals may be described as hyper-complex numbers. For example, data points (a) and (b) may be generalized as a=[$a_1$, $a_2$, . . . , $a_n$] and b=[$b_1$, $b_2$, . . . , $b_n$], where n=3 in FIG. 3. In other examples, n may be equal to an integer less than or greater than 3.

In the present example, assume that Series 1 and Series 2 both contain different components with missing data. For example, cells containing the term null represent components missing data. Therefore, cells 220 and 320 represent components missing data indicative of measured density in the first and second wells; cells 230 and 330 represent components missing data indicative of measured porosity in the first and second wells; and cells 240, 245 340 and 345 represent components missing data indicative of measured permeability in the first and second wells.

When performing DTW according to standard techniques, the distance between a given point in Series 1 and a given point in Series 2 may be calculated using various distance metrics such as Euclidean distance, Manhattan distance, Canberra distance, and the like. For instance, the distance may be determined by calculating the $l^k$ norm according to the following equation:

$$\varepsilon_k(a, b) = \sqrt[k]{\sum_i |\delta_i|^k},$$ (Equation 1)

where $\delta_i = a_i - b_i$.

In the equation above, $\varepsilon_k$ denotes the distance between data points a and b, k denotes a number of a norm 1, and i denotes the number of components in Series 1 and 2. Variable k may typically be equal to 1 or 2, meaning the $l^1$ norm is used or the $l^2$ norm is used, where the $l^1$ norm refers to the Manhattan distance metric and the $l^2$ norm refers to the Euclidean distance metric. When using the Euclidean distance metric, Equation 1 may be used to calculate the distance between the data point comprising components $a_1$, $a_2$, $a_3$ in Series 1 and the data point comprising components $b_1$, $b_2$, $b_3$ in Series 2 as shown below:

$$\varepsilon_2(a,b) = \sqrt{\delta_1^2 + \delta_2^2 + \delta_3^2},$$

where $\delta_1^2 = (a_1-b_1)^2$, $\delta_2^2 = (a_2-b_2)^2$, and $\delta_3^2 = (a_3-b_3)^2$.

In general, performing DTW using Equation 1 above can provide efficient and reasonable results in some cases. However, as described further below with respect to FIG. 4, complications can arise when performing DTW to calculate distance between two data points a and b if one or both data points contain a null component.

Figure 4:
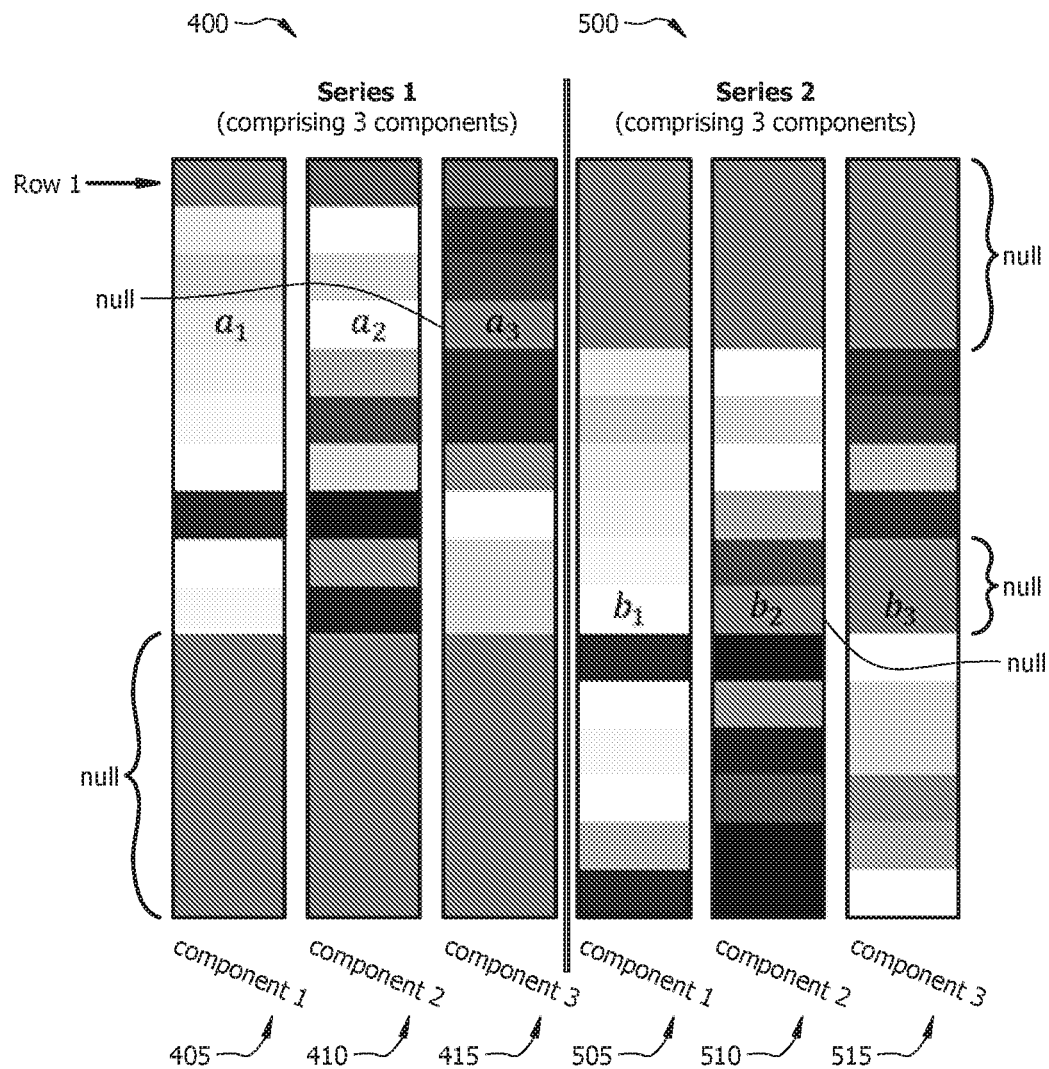
FIG. 4 illustrates an example of a first well log sequence to be correlated with a second well log sequence in accordance with embodiments of the present disclosure.

FIG. 4 depicts a first well sequence signal 400 to be correlated with a second well sequence 500 according to embodiments of the disclosure. Unless stated otherwise, the first and second well sequence signals 400, 500 may be substantially similar to the first and second well sequence signals 200, 300 in FIG. 3. For example, the first and second sequence signals 400 and 500 refer to time-series data corresponding to Series 1 and Series 2, comprising three components 405, 410, 415 and 505, 510, 515.

For discussion purposes, it may be assumed that signal components 405 and 505 correspond to respective density measurements from the first and second wells; signal components 410 and 510 correspond to respective porosity measurements from the first and second wells; and signal components 415 and 515 correspond to respective permeability measurements from the first and second wells. It may also be assumed that data points corresponding to components 405, 410, and 415 in cells of the bottom 5 rows in Series 1 contain nulls, while data points corresponding to components 505, 510, and 515 in cells of the top 4 rows in Series 2 contain nulls.

In FIG. 4, the fourth row of Series 1 denotes a first data point a containing components $a_1$, $a_2$, $a_3$, while the tenth row of Series 2 denotes a second data point b containing components $b_1$, $b_2$, $b_3$, i.e., a=[$a_1$, $a_2$, $a_3$] and b=[$b_1$, $b_2$, $b_3$]. To illustrate an example of correlating data points a and b, assume that in data point a, components $a_1$ and $a_2$ contain real values (i.e., valid data), while data from component $a_3$ contains null data (i.e., invalid or missing data). Further assume that in data point b, component $b_1$ contains a real value, while components $b_2$ and $b_3$ contain null data. As shown below, an undefined value is returned when using Equation 1 above to calculate the Euclidean distance between data points a and b.

$$\varepsilon_2(a, b) = \sqrt{(a_1 - b_1)^2 + (a_2 - b_2)^2 + (a_3 - b_3)^2}$$
$$= \sqrt{(a_1 - b_1)^2 + (a_2 - \text{null})^2 + (\text{null} - \text{null})^2}$$
$$= \text{undefined!}$$

As a result, DTW cannot be performed to assess similarity between data points a and b when data is missing from either or both data points. Some approaches may handle this issue by simply disregarding the null data such as components $a_3$, $b_2$ and $b_3$ in the example above, in which case DTW may be performed using only components containing valid data. Other approaches may handle this issue by replacing the null data with zeroes or random values, which may include data estimated to be representative of the missing data. Disregarding or replacing null data may yield somewhat acceptable or reasonable results if a relatively small quantity of data is missing from Series 1 and Series 2.

However, typical DTW algorithms involve comparing every data point in Series 1 to every data point in Series 2. In other words, DTW involves comparing the distance of the data point corresponding to the three components in row 1 of Series 1 to not only the data point corresponding to the three components in row 1 of Series 2, but also the data points corresponding to the three components in rows 2 to 15 of Series 2. The process continues to calculate the distances between the data point corresponding to the three components in row 2 of Series 1 and the data points corresponding to the three components in all 16 rows of Series 2. Therefore, typical DTW algorithms may not produce feasible results in scenarios where relatively large quantities of data are missing from Series 1 and/or Series 2. For example, disregarding or replacing such missing data may yield spurious results.

According to embodiments of the present disclosure, a distance metric is provided such that DTW may be performed to correlate a pair of sequence signals comprising one or more nulls. To this end, the distance between any two data points in a first sequence signal and a second sequence signal may be calculated using Equation 1 above, except the delta value $\delta_i$ for each component, i, may be calculated according to the following equation:

$$\delta_i = \begin{cases} a_i - b_i & \text{when neither } a_i \text{ nor } b_i \text{ is null} \\ C_i & \text{when exactly one of } a_i \text{ and } b_i \text{ is null}, \\ \lambda C_i & \text{when both } a_i \text{ and } b_i \text{ are null} \end{cases} \quad \text{(Equation 2)}$$

where $C_i$ denotes a constant value and $\lambda$ denotes a value between 1 and 2.

Redefining the delta value according to Equation 2 ensures a non-negative real distance value is generated even when data is missing from one or more components of a first sequence signal and/or a second sequence signal. As in the example discussed above, assume that components $a_1$ and $a_2$ in Series 1 of FIG. 4 contain real values (i.e., valid data), while data from component $a_3$ contains null data (i.e., invalid or missing data). Further assume that component $b_1$ in Series 2 of FIG. 4 contains a real value, while components $b_2$ and $b_3$ contain null data. Like the previous example, the Euclidean distance between data points a and b may be calculated using Equation 1 (reproduced below), except applying the delta value $\delta_i$ defined in Equation 2.

$$\varepsilon_2(a,b) = \sqrt{\delta_1^2 + \delta_2^2 + \delta_3^2},$$

Because this example assumes that components $a_1$ and $b_1$ contain valid data, the corresponding delta value $\delta_i$ may be expressed according to the standard equation, i.e., $\delta_1^2 = (a_1 - b_1)^2$. This example also assumes that component $a_2$ contains valid data, but that component $b_2$ is missing data. According to Equation 2, the corresponding delta value $\delta_i$ is equal to a constant $C_i$ because exactly one component ($b_2$) is null, i.e., $\delta_2^2 = (C_2)^2$. This example further assumes that components $a_3$ and $b_3$ are both missing data. Therefore, according to Equation 2, the corresponding delta value $\delta_i$ is equal to the product of a constant $C_i$ and a value $\lambda$ between 1 and 2 because both components ($a_3$ and $b_3$) are null, i.e., $\delta_3^2 = (\lambda C_3)^2$.

It can be seen from above that applying Equation 2 ensures that three valid data values may be used as inputs to solve for Equation 1. Thus, in the example above, the Euclidean distance between data points a and b may be calculated by taking the square root of the sum, $\delta_1^2 + \delta_2^2 + \delta_3^2$, as shown below.

$$\varepsilon_k(a,b) = \sqrt{(a_1 - b_1)^2 + (C_2)^2 + (\lambda C_3)^2}$$

In some embodiments, the value of the constant $C_i$ may be determined empirically, e.g., based on the distribution of values in $i^{th}$ component in the two sequence signals 400 and 500. In embodiments employing DTW, the value of the constant $C_i$ may be defined to be half of the difference between the $80^{th}$ percentile and the $20^{th}$ percentile of the combined set of data points from the $i^{th}$ component of Series 1 and Series 2, so as to exclude any extreme outsiders falling outside the $80^{th}$ and $20^{th}$ percentiles. By defining the constant $C_i$ in this manner, the distance between a valid data value (e.g., $a_2$ in Series 1) and a null value (e.g., $b_2$ in Series 2) may be noticeably high compared to the distance between that valid data value and one of its neighboring valid data values. This distance between that valid data value and null value may be even higher when performing a medium to high level of autocorrelation within each of Series 1 and 2.

In some embodiments, lambda $\lambda$ may be equal to a constant between one and two. According to some aspects, the value of $\lambda$ should be greater than one, but less than or equal to two. For example, having a value of $\lambda$ greater than one may ensure that the distance between null values is always greater than the distance between a real value and a null value. Further, in embodiments employing DTW, the value of $\lambda$ may be equal to about 1.5.

Figure 5:
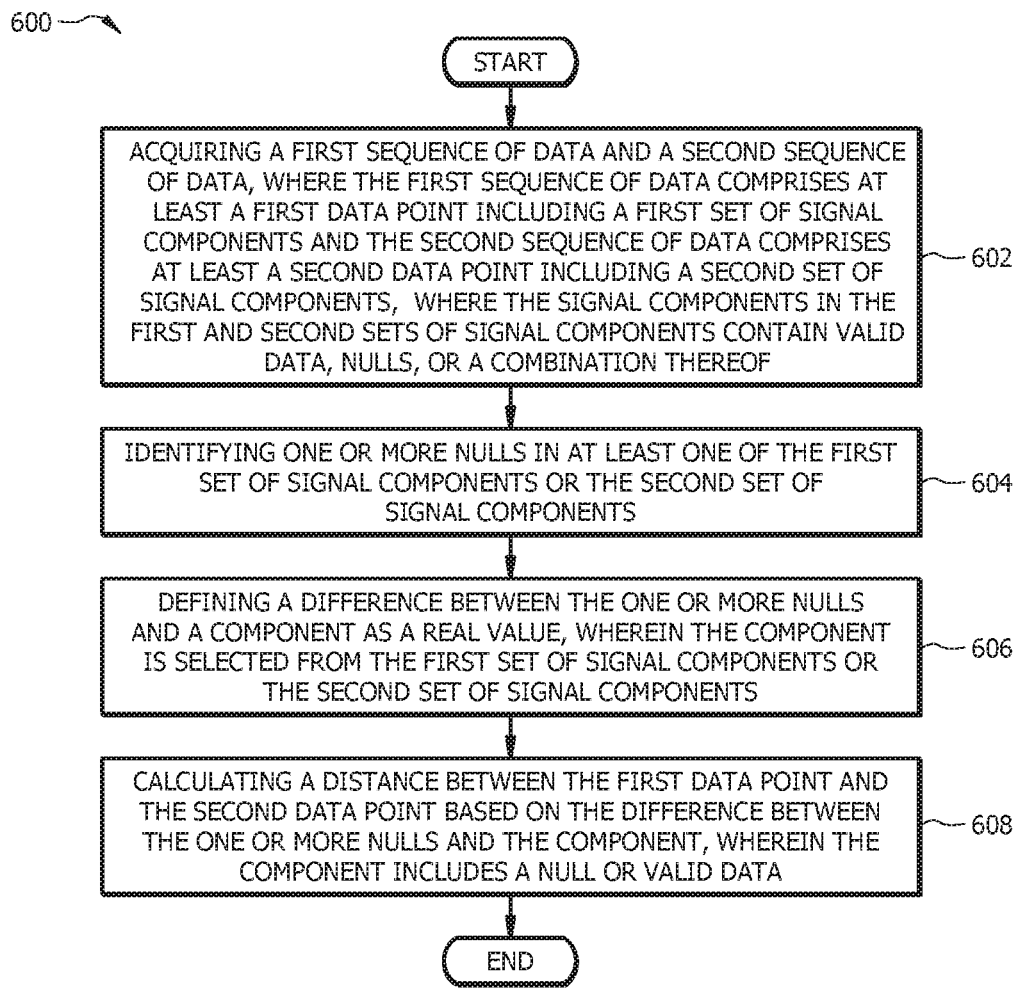
FIG. 5 illustrates a flowchart for correlating well logs from different wells in accordance with embodiments of the present disclosure.

FIG. 5 illustrates a method 600 for correlating data in accordance with embodiments of the present disclosure. The operations may be performed in the order shown, or in a different order. Further, two or more of the operations may be performed concurrently instead of sequentially. In some implementations, some of the operations of the method 600 can be implemented as instructions stored in a storage device and executed by a controller and/or processor.

At block 602, The method 600 includes acquiring a first sequence of data and a second sequence of data, where the first sequence of data comprises at least a first data point including a first set of signal components and the second sequence of data comprises at least a second data point including a second set of signal components, and where the signal components in the first and second sets of signal components contain valid data, nulls, or a combination thereof. In some implementations, the first and second sequence signals may comprise time-dependent sequences, space-ordered sequences, and/or depth-ordered sequences. In addition, the first and second sets of components may comprise measurement parameters associated with a first well and second well, respectively.

At block 604, the method 600 includes identifying one or more nulls in at least one of the first set of signal components or the second set of signal components. At block 606, the method 600 includes defining a difference between the one or more nulls and a component as a real value, where the component is selected from the first set of signal components or the second set of signal components. At block 608, the method includes calculating a distance between the first data point and the second data point based on the difference between the one or more nulls and the component, where the component includes a null or valid data.

Figure 6:
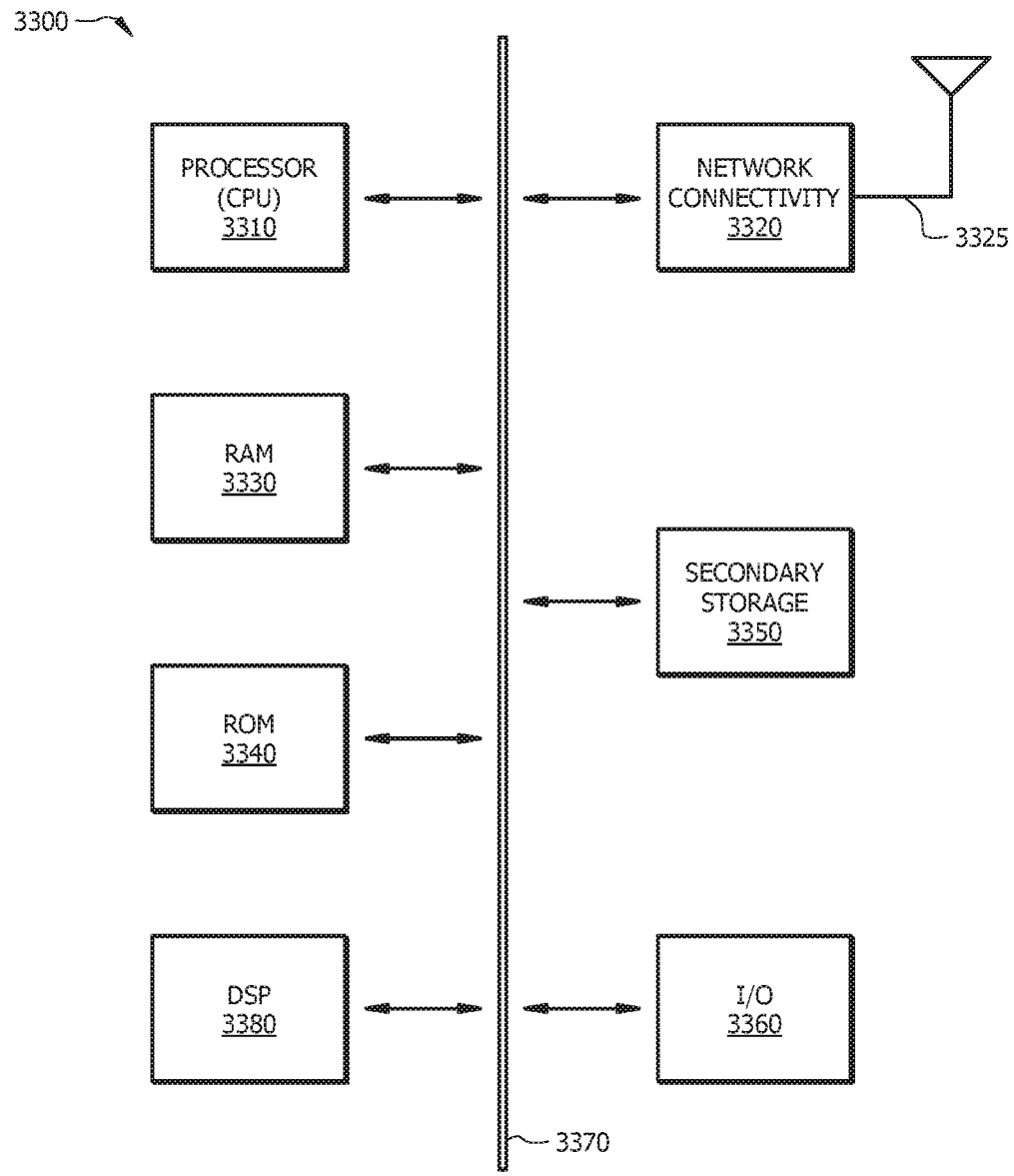
FIG. 6 illustrates a schematic of a computer system and related components suitable for implementing embodiments of the present disclosure.

FIG. 6 illustrates an example of a computer system 3300 that includes a processing component 3310 suitable for implementing embodiments disclosed herein. In addition to the processor 3310 (which may be referred to as a central processor unit (CPU)), the system 3300 might include network connectivity devices 3320, random access memory (RAM) 3330, read only memory (ROM) 3340, secondary storage 3350, input/output (I/O) devices 3360, and a digital signal processor (DSP) 3380. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, Universal Serial Bus (USB) interface devices, serial interfaces, token ring devices, fiber distributed data interface (FDDI) devices, wireless local area network (WLAN) devices, radio transceiver devices such as code division multiple access (CDMA) devices, new generation radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly. Signals received by network connectivity devices 3320 may be processed by one or more components of the system 3300 to perform functions such as signal amplification, frequency down conversion, filtering, channel selection, and the like. Analog to digital (A/D) conversion of signals may allow more complex communication functions, such as demodulation and decoding to be performed in the DSP 3380. In a similar manner, signals to be transmitted are processed, including modulation and encoding for example, by DSP 3380 and are processed by one or more components of the computer system 3300 for digital to analog (D/A) conversion, frequency up conversion, filtering, amplification, and transmission. DSP 3380 may be configured to process communication signals and provide for receiver and transmitter control. For example, gains applied to communication signals received or transmitted via the computer system 3300 may be adaptively controlled through automatic gain control algorithms implemented in DSP 3380.

The RAM 3330 might be used to store volatile data and/or instructions that are executed by the processor 3310. The ROM 3340 may be a non-volatile memory device having a smaller memory capacity than the memory capacity of the secondary storage 3350. ROM 3340 might be used to store instructions and/or data that are read during execution of the instructions. Access to both RAM 3330 and ROM 3340 may typically be faster than access to secondary storage 3350. The secondary storage 3350 may comprise of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, graphical user interfaces (GUIs), card readers, paper tape readers, printers, video monitors, or other well-known input/output devices. Also, the transceiver 3325 might be considered to be a component of the I/O devices 3360 instead of or in addition to being a component of the network connectivity devices 3320.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. Consequently, the disclosure is intended to be limited only by the spirit and scope of the appended claims, giving full cognizance to equivalents in all respects. The terms in the claims have their plain, ordinary meaning unless otherwise explicitly and clearly defined by the patentee.

The terms "couple" or "couples" as used herein are intended to mean either an indirect or a direct connection. Thus, if a first device couples to a second device, that connection may be through a direct connection, or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections. Finally, the term "uphole" as used herein means along the drill string or the hole from the distal end towards the surface, and "downhole" as used herein means along the drill string or the hole from the surface towards the distal end.

It is to be understood that any one or more of the embodiments disclosed herein may be implemented by a controller or control unit. For purposes of this disclosure, a controller or control unit may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, a controller or control unit may be a personal computer, a network storage device, or any other suitable device and may vary in size, shape, performance, functionality, and price. The controller or control unit may include random access memory (RAM), one or more processing resources such as a central processing unit (CPU) or hardware or software control logic, ROM, and/or other types of nonvolatile memory. Additional components of the controller or control unit may include one or more disk drives, one or more network ports for communication with external devices as well as various input and output (I/O) devices, such as a keyboard, a mouse, and a video display. The controller or control unit may also include one or more buses operable to transmit communications between the various hardware components.

Further, the controller or control unit may comprise or be connected to computer-readable media. For purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

The foregoing describes in detail a current sensing system, method, and apparatus in accordance with embodiments of the present disclosure. In this specification, examples are used to describe principles and implementations of the present disclosure, and the description of the embodiments is only intended to help understand such principles and implementations. In conclusion, the content of this specification shall not be construed as a limitation on the present disclosure.

Additional Disclosure

The following are non-limiting, specific embodiments in accordance with the present disclosure:

A first embodiment, which is a method for correlating data, comprising acquiring a first sequence of data and a second sequence of data, wherein the first sequence of data comprises at least a first data point including a first set of signal components and the second sequence of data comprises at least a second data point including a second set of signal components, wherein the signal components in the first and second sets of signal components contain valid data, nulls, or a combination thereof; identifying one or more nulls in at least one of the first set of signal components or the second set of signal components; defining a difference between the one or more nulls and a component value as a real value, wherein the component value is a measurement of a component selected from the first set of signal components or the second set of signal components; and calculating a distance between the first data point and the second data point based on the difference between the one or more nulls and the component value, wherein the component value includes a null or valid data.

A second embodiment, which is the method of the first embodiment, further comprising performing dynamic time warping (DTW) to correlate the first sequence of time series data to the second series of time series data.

A third embodiment, which is the method of the first or the second embodiment, wherein the first sequence of data and the second sequence of data are acquired from a log of a first well and a log of a second well, respectively.

A fourth embodiment, which is the method of the third embodiment, wherein the first set of signal components in the first data point represent parameters at a first depth of a borehole within the first well, and wherein the second set of signal components in the second data point represent parameters at a second depth of a borehole within the second well.

A fifth embodiment, which is the method of the fourth embodiment, wherein a first signal component in the first set of signal components represents a same type of parameter represented by a signal component in the second set of signal components, and wherein a second signal component in the first set of signal components represents another type of parameter represented by another signal component in the second set of signal components.

A sixth embodiment, which is the method of the fourth embodiment, wherein the parameters represented by the first and second signal components comprise at least two or more of density measurements, porosity measurements, permeability measurements, gamma ray measurements, formation resistivity measurements, or velocity measurements.

A seventh embodiment, which is the method of any of the first through the sixth embodiments, wherein calculating the distance between the first data point and the second data point comprises calculating one of a Euclidean distance or a Manhattan distance between the first data point and the second data point.

An eighth embodiment, which is the method of any of the first through the seventh embodiments, wherein the distance between the first data point and the second data point is calculated according to the following equation:

$$\varepsilon_k(a, b) = \sqrt[k]{\sum_i |\delta_i|^k}$$

where $\varepsilon_k$ denotes the distance between data points a and b, where a denotes the first data point and b denotes the second data point, where k denotes a norm number, where i denotes a quantity of signal components in the first and second sets of signal components, and where $\delta_i$ denotes a delta value for each signal component.

A ninth embodiment, which is the method of the eighth embodiment, wherein the delta value is calculated according to the following equation:

$$\delta_i = \begin{cases} a_i - b_i & \text{when neither } a_i \text{ nor } b_i \text{ is null} \\ C_i & \text{when exactly one of } a_i \text{ and } b_i \text{ is null} \\ \lambda C_i & \text{when both } a_i \text{ and } b_i \text{ are null} \end{cases}$$

where $C_i$ denotes a first constant and $\lambda$ denotes a second constant.

A tenth embodiment, which is the method of the ninth embodiment, wherein the first constant is defined as half of a difference between an $80^{th}$ percentile and a $20^{th}$ percentile of a combined set of data points from an $i^{th}$ signal component in the first and second sequence signals.

An eleventh embodiment, which is the method of the ninth embodiment, wherein the second constant is a value between 1 and 2.

A twelfth embodiment, which is the method of any of the first through the eleventh embodiments, wherein defining the one or more nulls as the real value comprises defining the difference between the one or more nulls and the component value as a first value when the one or more nulls comprise only one null and the component value comprises valid data, and wherein defining difference between the one or more nulls and the component value as the real value comprises defining the one or more nulls as a second value when the one or more nulls comprise a null and the component value comprises a null.

A thirteenth embodiment, which is the method of the twelfth embodiment, wherein the second value is greater than the first value.

A fourteenth embodiment, which is a method of correlating data from a pair of well logs, comprising acquiring output signals of a first logging tool and a second logging tool lowered into boreholes of a first well and a second well, the output signals representing parameters of earth formations surrounding the boreholes of the first well and the second well; generating a first well log and a second log based on the output signals of the first logging tool and the second logging tool, wherein the first well log corresponds to a first sequence of data and the second well log corresponds to a second sequence of data; comparing a first data point selected from the first sequence of data to a second data point selected from the second sequence of data, wherein the first data point comprises a first set of signal components and the second data point comprises a second set of signal components, wherein the signal components in the first and second sets of signal components contain valid data, nulls, or a combination thereof; identifying one or more nulls in at least one of the first set of signal components or the second set of signal components; defining a difference between the one or more nulls and a component value as a real value, wherein the component value is a measurement of a component selected from the first set of signal components or the second set of signal components; and determining a correlation between the first well log and the second well log by performing dynamic time warping based on the real value defined by the difference between the one or more nulls and the component value, wherein the component value comprises a null or valid data.

A fifteenth embodiment, which is a non-transitory storage medium comprising computer-readable instructions executable by a processor to implement a method for correlating data, the method comprising acquiring a first sequence of data and a second sequence of data, wherein the first sequence of data comprises at least a first data point including a first set of signal components and the second sequence of data comprises at least a second data point including a second set of signal components, wherein the signal components in the first and second sets of signal components contain valid data, nulls, or a combination thereof; identifying one or more nulls in at least one of the first set of signal components or the second set of signal components; defining a difference between the one or more nulls and a component value as a real value, wherein the component value is a measurement of a component selected from the first set of signal components or the second set of signal components; and calculating a distance between the first data point and the second data point based on the difference between the one or more nulls and the component value, wherein the component value includes a null or valid data.

A sixteenth embodiment, which is the non-transitory storage medium of the fifteenth embodiment, the method further comprising performing dynamic time warping (DTW) to correlate the first sequence of time series data to the second series of time series data.

A seventeenth embodiment, which is the non-transitory storage medium of any of the fifteenth through the sixteenth embodiments, wherein the first sequence of data and the second sequence of data are acquired from a log of a first well and a log of a second well, respectively.

An eighteenth embodiment, which is the non-transitory storage medium of the seventeenth embodiment, wherein the first set of signal components in the first data point represent parameters at a first depth of a borehole within the first well, and wherein the second set of signal components in the second data point represent parameters at a second depth of a borehole within the second well.

A nineteenth embodiment, which is the non-transitory storage medium of the eighteenth embodiment, wherein a first signal component in the first set of signal components represents a same type of parameter represented by a signal component in the second set of signal components, and wherein a second signal component in the first set of signal components represents another type of parameter represented by another signal component in the second set of signal components.

A twentieth embodiment, which is the non-transitory storage medium of the eighteenth embodiment, wherein the parameters represented by the first and second signal components comprise at least two or more of density measurements, porosity measurements, permeability measurements, gamma ray measurements, formation resistivity measurements, or velocity measurements.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method for correlating data, comprising:
    acquiring a first sequence of data and a second sequence of data, wherein the first sequence of data comprises at least a first data point including a first set of signal components and the second sequence of data comprises at least a second data point including a second set of signal components, wherein the signal components in the first and second sets of signal components contain valid data, nulls, or a combination thereof;
    identifying one or more nulls in at least one of the first set of signal components or the second set of signal components;

defining a difference between the one or more nulls and a component value as a real value, wherein the component value is a measurement of a component selected from the first set of signal components or the second set of signal components; and calculating a distance between the first data point and the second data point based on the difference between the one or more nulls and the component value, wherein the component value includes a null or valid data.

2. The method of claim 1, further comprising performing dynamic time warping (DTW) to correlate the first sequence of data to the second of data.

3. The method of claim 2, wherein the first sequence of data and the second sequence of data are time series data.

4. The method of claim 1, wherein the first sequence of data and the second sequence of data are acquired from a log of a first well and a log of a second well, respectively.

5. The method of claim 4, wherein the first set of signal components in the first data point represent parameters at a first depth of a borehole within the first well, and wherein the second set of signal components in the second data point represent parameters at a second depth of a borehole within the second well.

6. The method of claim 5, wherein a first signal component in the first set of signal components represents a same type of parameter represented by a signal component in the second set of signal components, and wherein a second signal component in the first set of signal components represents another type of parameter represented by another signal component in the second set of signal components.

7. The method of claim 5, wherein the parameters represented by the first and second signal components comprise at least two or more of density measurements, porosity measurements, permeability measurements, gamma ray measurements, formation resistivity measurements, or velocity measurements.

8. The method of claim 1, wherein calculating the distance between the first data point and the second data point comprises calculating one of a Euclidean distance or a Manhattan distance between the first data point and the second data point.

9. The method of claim 1, wherein the distance between the first data point and the second data point is calculated according to the following equation:

$$\varepsilon_k(a, b) = \sqrt[k]{\sum_i |\delta_i|^k},$$

where $\varepsilon_k$ denotes the distance between data points a and b, where a denotes the first data point and b denotes the second data point, where k denotes a norm number, where i denotes a quantity of signal components in the first and second sets of signal components, and where $\delta_i$ denotes a delta value for each signal component.

10. The method of claim 9, wherein $\delta_i$ is calculated according to the following equation:

$$\delta_i = \begin{cases} a_i - b_i & \text{when neither } a_i \text{ nor } b_i \text{ is null} \\ C_i & \text{when exactly one of } a_i \text{ and } b_i \text{ is null}, \\ \lambda C_i & \text{when both } a_i \text{ and } b_i \text{ are null} \end{cases}$$

where $C_i$ denotes a first constant and $\lambda$ denotes a second constant.

11. The method of claim 10, wherein $C_i$ is defined as half of a difference between an 80th percentile and a 20th percentile of a combined set of data points from an $i^{th}$ signal component in the first and second sequence signals.

12. The method of claim 10, wherein $\lambda$ is a value between 1 and 2.

13. The method of claim 1, wherein defining the difference between the one or more nulls and the component value as the real value comprises defining the difference between the one or more nulls and the component value as a first value when the one or more nulls comprise only one null and the component value comprises valid data, and wherein defining difference between the one or more nulls and the component value as the real value comprises defining the one or more nulls as a second value when the one or more nulls comprise a null and the component value comprises a null.

14. The method of claim 13, wherein the second value is greater than the first value.

15. A method of correlating data from a pair of well logs, comprising:

acquiring output signals of a first logging tool and a second logging tool lowered into boreholes of a first well and a second well, the output signals representing parameters of earth formations surrounding the boreholes of the first well and the second well;

generating a first well log and a second log based on the output signals of the first logging tool and the second logging tool, wherein the first well log corresponds to a first sequence of data and the second well log corresponds to a second sequence of data;

comparing a first data point selected from the first sequence of data to a second data point selected from the second sequence of data, wherein the first data point comprises a first set of signal components and the second data point comprises a second set of signal components, wherein the signal components in the first and second sets of signal components contain valid data, nulls, or a combination thereof;

identifying one or more nulls in at least one of the first set of signal components or the second set of signal components;

defining a difference between the one or more nulls and a component value as a real value, wherein the component value is a measurement of a component selected from the first set of signal components or the second set of signal components; and determining a correlation between the first well log and the second well log by performing dynamic time warping based on the real value defined by the difference between the one or more nulls and the component value, wherein the component value comprises a null or valid data.

16. A non-transitory storage medium comprising computer-readable instructions executable by a processor to implement a method for correlating data, the method comprising:

acquiring a first sequence of data and a second sequence of data, wherein the first sequence of data comprises at least a first data point including a first set of signal components and the second sequence of data comprises at least a second data point including a second set of signal components, wherein the signal components in the first and second sets of signal components contain valid data, nulls, or a combination thereof;

identifying one or more nulls in at least one of the first set of signal components or the second set of signal components;

defining a difference between the one or more nulls and a component value as a real value, wherein the component value is a measurement of a component selected from the first set of signal components or the second set of signal components; and calculating a distance between the first data point and the second data point based on the difference between the one or more nulls and the component value, wherein the component value includes a null or valid data.

17. The non-transitory storage medium of claim 16, the method further comprising performing dynamic time warping (DTW) to correlate the first sequence of data to the second sequence of data.

18. The method of claim 17, wherein the first sequence of data and the second sequence of data are time series data.

19. The non-transitory storage medium of claim 16, wherein the first sequence of data and the second sequence of data are acquired from a log of a first well and a log of a second well, respectively.

20. The non-transitory storage medium of claim 19, wherein the first set of signal components in the first data point represent parameters at a first depth of a borehole within the first well, and wherein the second set of signal components in the second data point represent parameters at a second depth of a borehole within the second well.

21. The non-transitory storage medium of claim 20, wherein a first signal component in the first set of signal components represents a same type of parameter represented by a signal component in the second set of signal components, and wherein a second signal component in the first set of signal components represents another type of parameter represented by another signal component in the second set of signal components.

22. The non-transitory storage medium of claim 20, wherein the parameters represented by the first and second signal components comprise at least two or more of density measurements, porosity measurements, permeability measurements, gamma ray measurements, formation resistivity measurements, or velocity measurements.

* * * * *

UNITED STATES PATENT AND TRADEMARK OFFICE
CERTIFICATE OF CORRECTION

PATENT NO. : 11,199,646 B2
APPLICATION NO. : 16/954880
DATED : December 14, 2021
INVENTOR(S) : Marc Paul Servais Page 1 of 1

It is certified that error appears in the above-identified patent and that said Letters Patent is hereby corrected as shown below:

In the Claims

Column 17, Line 12, replace "second of data" with --second sequence of data--.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*